(12) United States Patent
Kujira et al.

(10) Patent No.: US 6,509,661 B1
(45) Date of Patent: Jan. 21, 2003

(54) MOTOR AND ACTUATOR

(75) Inventors: Yukinobu Kujira, Toyohashi (JP); Naohisa Shinmura, Kosai (JP)

(73) Assignee: Asmo Co., Ltd. (JP)

( * ) Notice: Subject to any disclaimer, the term of this patent is extended or adjusted under 35 U.S.C. 154(b) by 0 days.

(21) Appl. No.: 09/481,193

(22) Filed: Jan. 11, 2000

(30) Foreign Application Priority Data

Jan. 14, 1999 (JP) ............................................. 11-007771
Jan. 21, 1999 (JP) ............................................. 11-013162

(51) Int. Cl.⁷ ............................. H02K 5/00; H02K 7/08; H02K 7/10; H02K 11/00
(52) U.S. Cl. ............................. 310/89; 310/90; 310/83; 310/71
(58) Field of Search .......................... 310/89, 83, 75 D, 310/90, 118

(56) References Cited

U.S. PATENT DOCUMENTS 3,452,226 A * 6/1969 Hettich ........................ 310/50
3,558,093 A * 1/1971 Chestnut et al. ............... 310/41
4,832,630 A * 5/1989 Alexander, Jr. et al. ......... 440/6
5,675,204 A * 10/1997 Kusumoto et al. ....... 310/154.16
6,112,583 A * 9/2000 Yamamura .................... 73/116
6,163,093 A * 12/2000 Shimizu et al. ................ 310/42
6,404,086 B1 * 6/2002 Fukasaku et al. ....... 310/156.08

FOREIGN PATENT DOCUMENTS

JP          363034904 A    *  2/1988
JP              9329215       12/1997
JP         2000278908 A    *  3/1999

* cited by examiner

Primary Examiner—Nestor Ramirez
Assistant Examiner—Guillermo Perez
(74) Attorney, Agent, or Firm—Madson & Metcalf

(57) ABSTRACT

A motor includes a hollow yoke having an open end. A coupling member is coupled to the yoke so as to cover the open end of the yoke. A stator is accommodated in the yoke and has a receptacle. A rotor is received in the receptacle of the stator. A first bearing is arranged in the coupling member or the stator to rotatably support a first end of the rotor. A second bearing is formed integrally with the yoke to rotatably support a second end of the rotor.

16 Claims, 7 Drawing Sheets

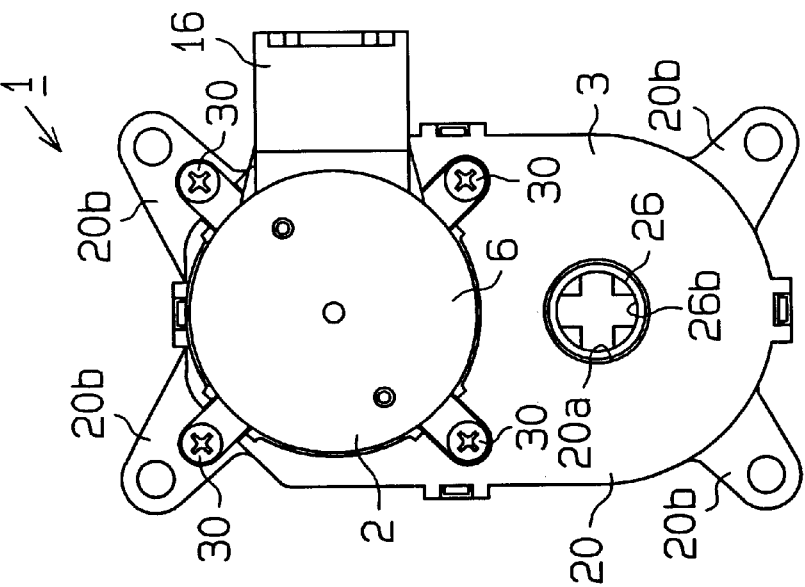
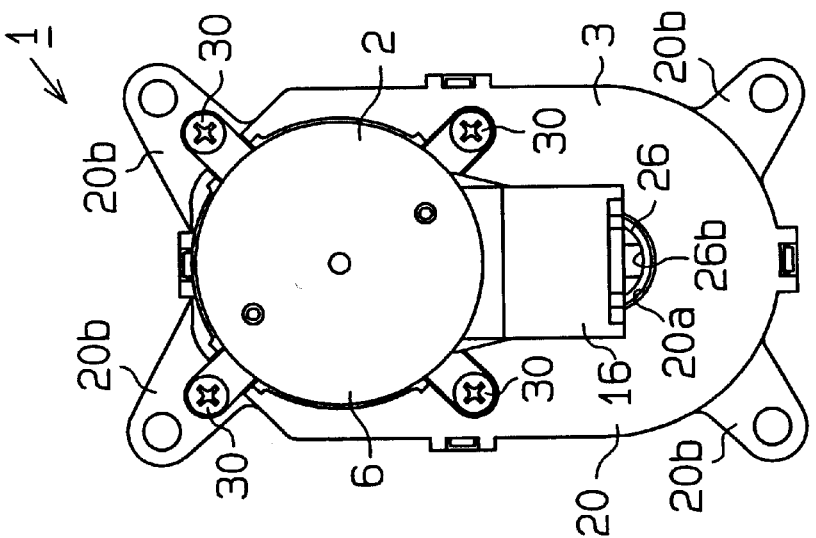
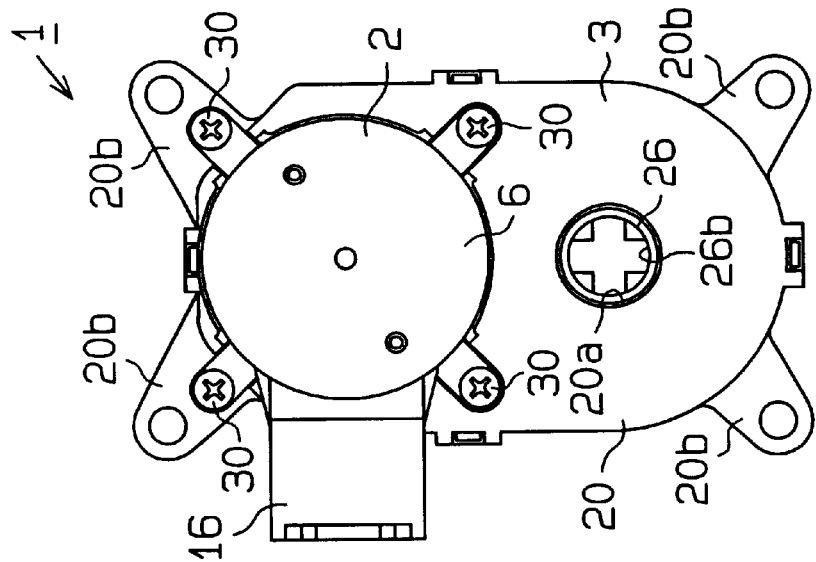

MOTOR AND ACTUATOR

BACKGROUND OF THE INVENTION

The present invention relates to a motor and an actuator for driving the motor.

Various types of dampers and louvers are provided in automobile air conditioner ducts to change the flow of air. Dampers are generally driven by actuators, which are typically powered by electric motors. Japanese Unexamined Patent Publication No. 9-329215 describes an example of such an actuator.

The actuator described in the publication has a gear case incorporating a speed reducer. A stepper motor is attached externally to the gear case. After installing the motor on the gear case, a receptacle housing is secured to the gear case to cover the bearing of the motor. This prevents dust from entering the space between the shaft of the motor and the bearing.

Although the receptacle housing improves the dust-resistance of the prior art actuator, the housing adds to the number of parts and increases the number of assembling steps. This, in turn, increases the production cost.

SUMMARY OF THE INVENTION

Accordingly, it is an object of the present invention to provide a motor and an actuator driven by the motor that is manufactured from a less number of components and has an improved dust resistance.

To achieve the above object, the present invention provides a motor including a hollow yoke having an open end, a coupling member coupled to the yoke so as to cover the open end of the yoke, and a stator accommodated in the yoke. The stator has a receptacle. A rotor is received in the receptacle. The rotor has a first end and a second end. A first bearing is arranged on the coupling member or the stator to rotatably support the first end of the rotor. A second bearing is formed integrally with the yoke to rotatably support the second end of the rotor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 6(a), 6(b), and 6(c) are plan views showing the motor arranged on a speed reducer at different positions.

DETAILED DESCRIPTION OF THE PREFERRED EMBODIMENTS

A first embodiment according to the present invention will now be described with reference to FIGS. 1 to 3.

Figure 1:
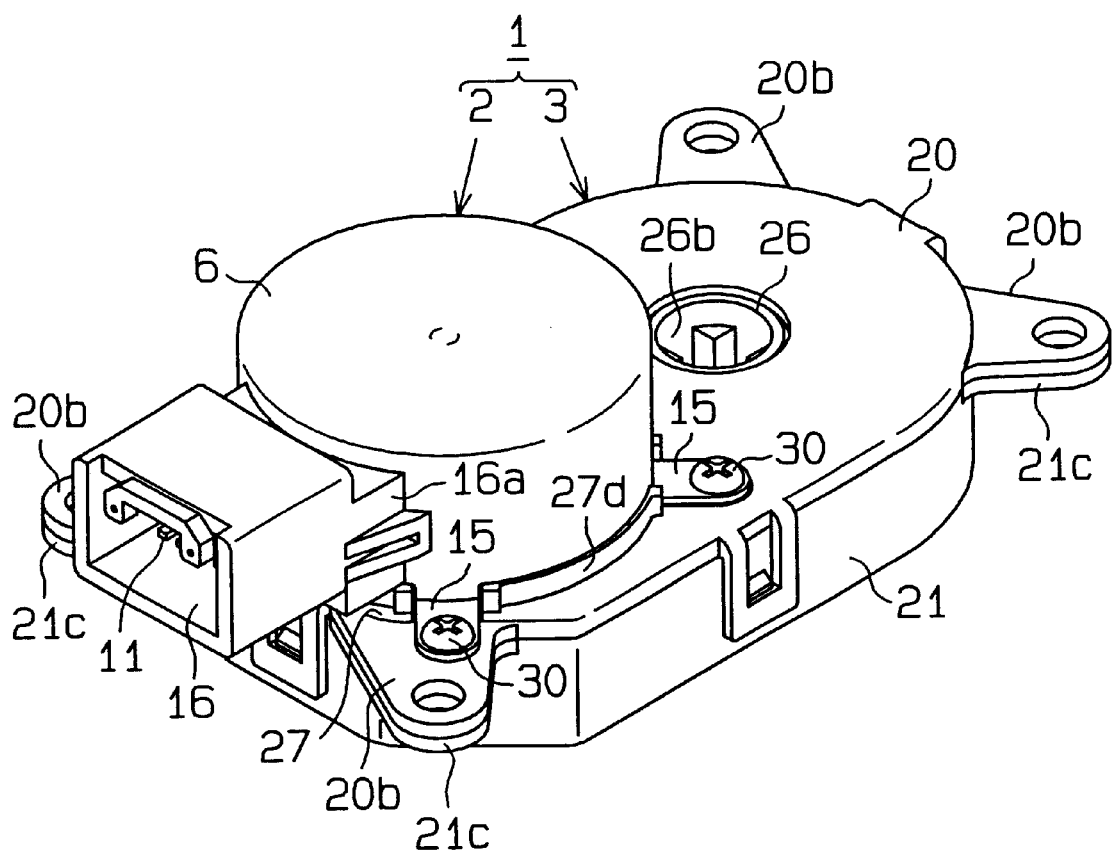
FIG. 1 is a perspective view showing an actuator according to a first embodiment of the present invention.
Figure 2:
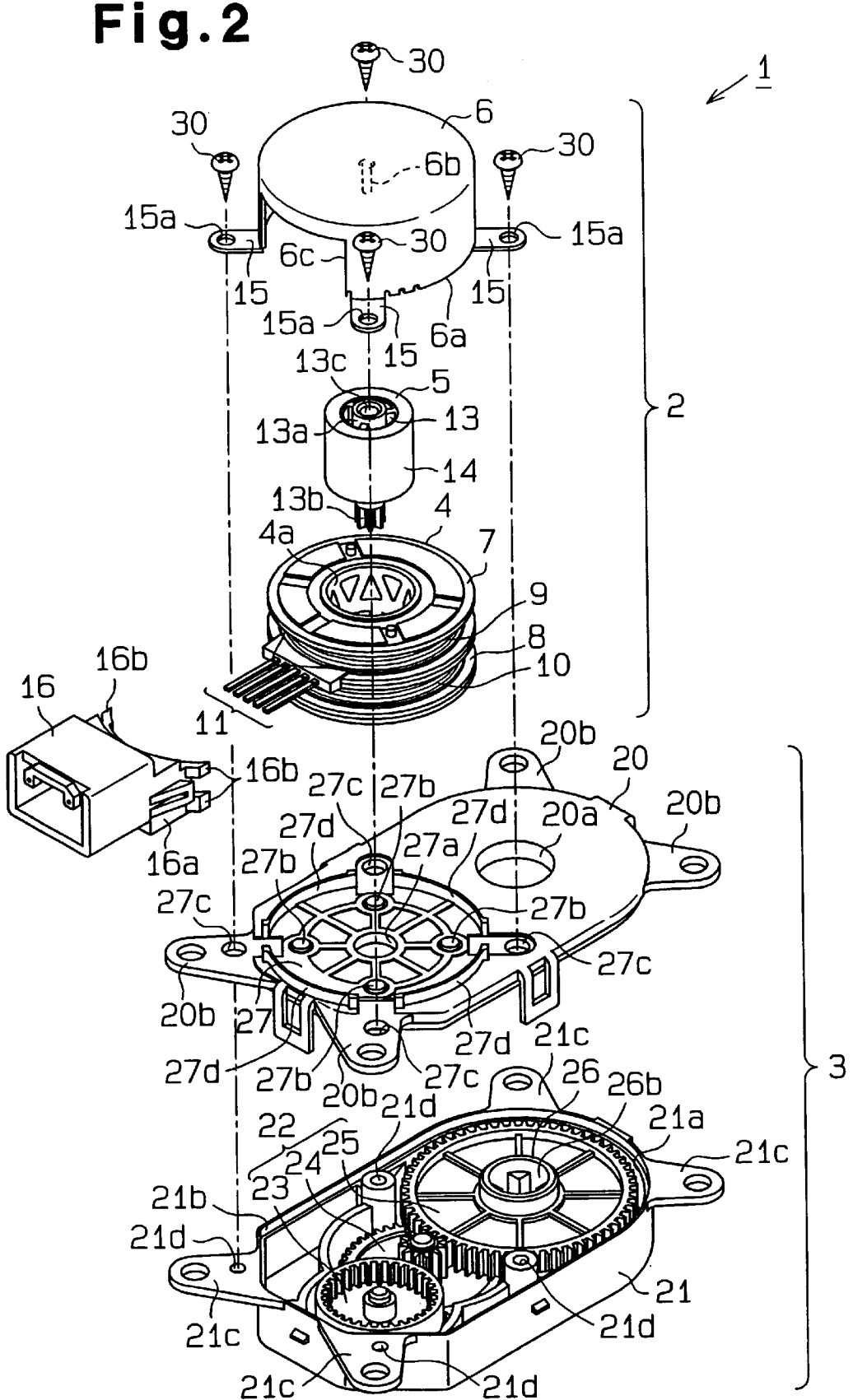
FIG. 2 is an exploded perspective view showing the actuator of FIG. 1.

FIGS. 1 and 2 show an actuator 1 according to the present invention. The actuator 1 is installed in an automobile air: conditioning unit (not shown) to control the position of dampers and change the flow of air from a duct of the unit.

The actuator 1 includes a motor 2 and a speed reducer 3. The motor is a stepper motor, which is optimal for positioning control. The motor 2 is formed by a stator core 4, a magnetic rotor 5, and a yoke 6. The stator core 4, which is annular, includes a pair of coil bobbins 7, 8 and is molded from resin. Excitation coils 9, 10 are wound about the coil bobbins 7, 8, respectively.

A plurality of connector pins 11 extend radially from the stator core 4. The connector pins 11 are connected to the terminals of the excitation coils 9, 10. A cup-like retainer 4a is provided at the center of the stator core 4 to receive the magnetic rotor 5. As shown in FIG. 3, an oil retaining metal bearing 12 (hereafter referred to as the bearing) is arranged at the bottom (the side close to the speed reducer 3) of the retainer 4a.

The magnetic rotor 5 includes a center piece 13 and a magnet 14. The center piece 13 is generally cylindrical and formed from synthetic resin. The center piece 13 has an integrally formed rotary shaft 13a. A pinion 13b is formed integrally at one end of the rotary shaft 13a. The rotary shaft 13a is rotatably supported by the bearing 12 in the vicinity of the pinion 13b, or the output side. A bearing cavity 13c extends through the rotary shaft 13a from one end (the upper end as viewed in FIG. 3) along axis L1. The non-output side of the rotary shaft 13a projects from the magnet 14.

The magnet 14, which is made of synthetic resin, is fixed to the outer surface of the center piece 13. The magnet 14 is formed integrally with the center piece 13 by arranging the center piece 13 in a mold and then charging the mold with molten magnetic resin. Afterward, multipolarity is applied to the magnet 14. A space 13d is provided between the magnet 14 and the rotary shaft 13a to absorb dimensional differences caused by thermal expansion and contraction when the center piece and the magnet 14 are molded integrally.

The yoke 6, which has a cap-like shape, has an inner diameter that is about the same as the outer diameter of the stator core 4, and the yoke 6 accommodates the stator core 4 and the magnetic rotor 5. The yoke 6 has an open end 6a, from which a plurality of yoke tabs 15 radially extend. The tabs 15 are used to secure the yoke 6 to a first gear housing 20. A screw hole 15a extends through each tab 15.

The tabs 15 are arranged about the axis L1 of the rotor at equal angular intervals (90° intervals). The screw holes 15a are arranged so that the center of a circle connecting the holes 15a coincides with the axis L1 of the rotor 5.

Figure 3:
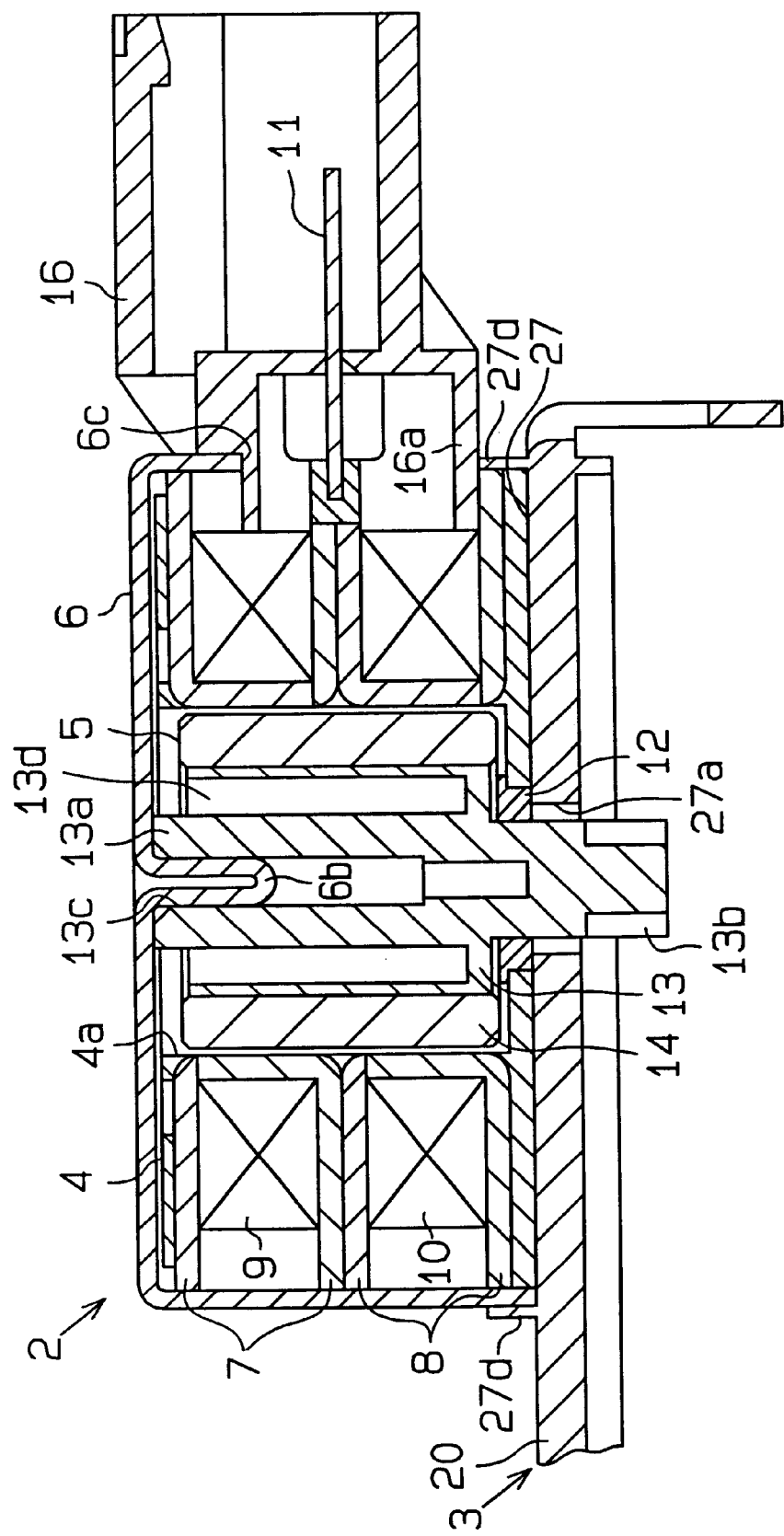
FIG. 3 is a partial cross-sectional view showing the actuator.

As shown in FIG. 3, a support 6b extends integrally and axially from the top center of the yoke 6. The support 6b is formed by drawing the center of the yoke 6 from the outer side to the inner side. The support 6b is fitted into the bearing cavity 13c to rotatably support the non-output side of the rotary shaft 13a. Grease is applied to the inner surface of the bearing cavity 13c.

The bearing 12 serves as a first bearing, and the support 6b serves as a second bearing.

As shown in FIG. 2, a generally rectangular cut-out portion 6c is formed by cutting away a portion of the yoke 6 between two of the tabs 15 from the open end 6a. A connector 16 is held in the cut-out portion 6c. The connector 16 is generally box-like and shaped to conform with the cut-out portion 6c.

The connector 16 has a socket (not shown) to receive the connector pins 11 of the stator core 4. The proximal end 16a of the connector 16 is arcuate to conform with the outer surface of the stator core 4. Part of the proximal end 16a is accommodated in the yoke 6. The proximal end 16a includes a plurality of hooks 16b, which are secured to the inner surface of the yoke 6, to prevent the connector 16 from falling out of the cut-out portion 6c. As apparent from FIG. 5, a bisector of a triangle formed by extending the two tabs 15 located on each side of the connector 16 lies on a line extending through the middle of the connector 16. A harness (not shown) for supplying external power to the motor 2 is connected to the connector 16.

The speed reducer 3 includes a coupling member, or the first gear housing 20, and a second gear housing 21. A reduction mechanism 22 is incorporated in the first and second gear housings 20, 21. More specifically, the second gear housing 21 has a hollow space 21a to accommodate the reduction mechanism 22. The reduction mechanism 22 includes an input gear 23, an intermediate gear 24, and an output gear 25. Each of the gears 23–25 is rotatably supported in the second gear housing 21 and meshed with an adjacent gear.

The input gear 23 is an integral gear and is meshed with the pinion 13b of the motor 2. This achieves a high reduction ratio without increasing the radial dimension of the input gear 23 and thus results in a smaller actuator 1. The speed of the rotational motion of the rotary shaft 13a is reduced by the input gear 23, the intermediate gear 24, and the output gear 25.

An output shaft 26 of the actuator 1 is arranged in the output gear 25. The output shaft 26 is generally tubular and has four equally spaced inward projections 26a, which define a cross-shaped connecting hole 26b. Each of the first and second gear housings 20, 21 have a support bore 20a (only the support bore 20a of the first gear housing 20 is shown in FIG. 2) to rotatably receive the output shaft 26. The output shaft 26 is exposed from each gear housing 20, 21. The damper (not shown) described above is fitted into the connecting hole 26b of the output shaft 26.

Figure 7:
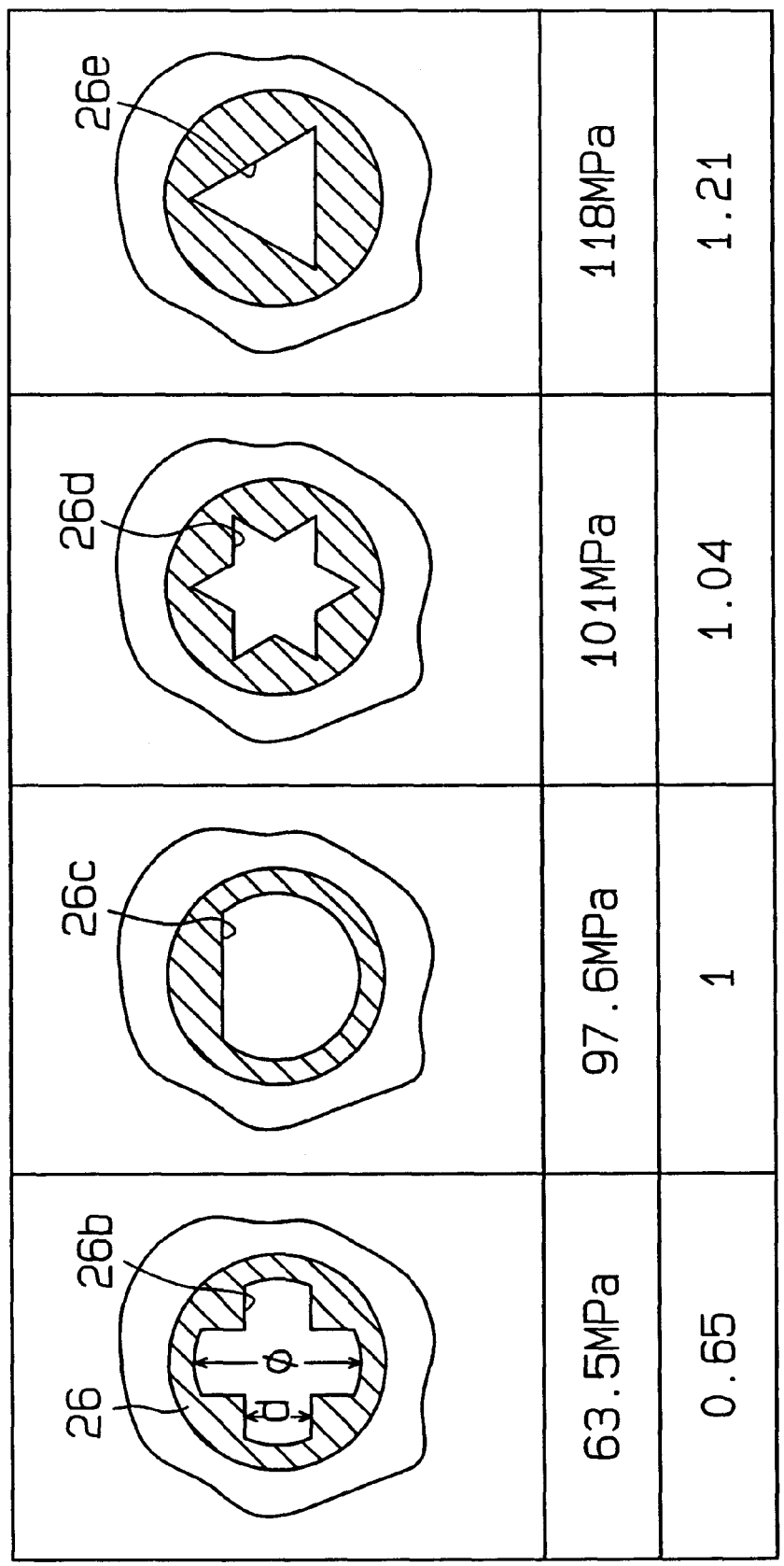
FIG. 7 is a diagram illustrating examples of connecting holes and the characteristics of the output shaft with such connecting hole.

With reference to FIG. 7, the cross shaped connecting hole 26b of the preferred embodiment has a major inner dimension φ of 10 mm and a minor dimension d of 4 mm. Examples of other connecting holes are also shown in FIG. 7. A connecting hole 26c having a D-shaped cross-section, a connecting hole 26d having a star-like cross-section, and a connecting hole 26e having a triangular cross-section are shown. An experiment was conducted to measure the stress applied to each; of the connecting holes 26b–26e during application of the same load.

Each of the connecting holes 26b–26e had a certain location where stress was concentrated. The maximum values measured at the stress concentrating location of each connecting hole 26b–26e were compared. The maximum value of stress for the D-shaped connecting hole 26c (97.6 MPa) was represented by "1". The relative maximum value of stress for the star-shaped connecting hole 26d was 1.04 (101 MPA), the relative stress value for the triangular connecting hole 26e was 1.21 (118 MPa), and the relative stress value for the connecting hole 26b of the preferred embodiment was 0.65 (63.5 MPa). The possibility of the output shaft 26 deforming is higher when the relative stress value is higher. Such deformation would cause the damper to become loose. However, the connecting hole 26b of the preferred embodiment has a low relative maximum stress value since the stress is dispersed. Thus, sufficient durability may be guaranteed without using expensive, high-rigidity materials.

The second gear housing 21 has an open end 21b into which the first gear housing 20 is fitted. Actuator tabs 20b, 21c extend from the outer surfaces of the first and second gear housings 20, 21, respectively. The tabs 20b, 21c are used to connect the actuator 1 to the air conditioning unit (not shown).

The first gear housing 20 has a coupling member 27, to which the motor 2 is coupled. The coupling member 27 includes a shaft hole 27a. Part of the rotary shaft 13a and the pinion 13b are inserted through the shaft hole 27a and into the housings 20, 21. Positioning projections 27b project from the coupling member 27 to position the stator core 4. The stator core 4 has positioning holes (not shown) to receive the positioning projections 27b.

A generally annular lip 27d is formed integrally with the coupling member 27. The yoke 6 is fitted to the lip 27d, which is formed to avoid interference with the tabs 15 and the connector 16. Accordingly, the lip 27d is in contact with substantially the entire outer surface of the yoke 6 at the open end 6a.

The stator core 4 is placed on the coupling member 27 with the positioning projections 27b engaged with the positioning holes of the stator core 4. The connector pins 11 are then inserted into the socket of the connector 16, and the connector 16 is pressed toward the stator core 4 until the proximal end 16a contacts the stator core 4. This connects the connector 16 to the stator core 4. In this state, the yoke 6 is fitted into the lip 27d of the coupling member 27 to close the stator core 4. This secures the hooks 16b of the connector 16 to the inner surface of the yoke 6 so that the connector 16 is held by the yoke 6.

Screw holes 27c, which are spaced from one another by equal angular intervals (90° intervals), extend through the coupling member 27 at positions corresponding to the screw holes 15a of the yoke tabs 15. The screw holes 27c are located outward from the positioning projections 27b and are arranged so that a circle connecting the holes 27c is coaxial with the shaft hole 27a. The second gear housing 21 has threaded holes 21d arranged in correspondence with the screw holes 27c. Each screw hole 27c is located along a line extending radially from the center of the shaft hole 27a and through the associated positioning projection 27b.

As shown in FIGS. 5 and 6(a) to 6(c), the motor 2 can be coupled to the speed reducer 3 at any one of four positions. In other words, the stator core 4 of the motor 2 and the yoke 6 can be coupled to the coupling member 27 at any one of a first position shown in FIG. 5, a second position, which is rotated 90° from the first position in the counterclockwise direction, as shown in FIG. 6(a), a third position, which is further rotated 90° from the second position in the counterclockwise direction, as shown in FIG. 6(b), and a fourth position, which is further rotated 90° from the third position in the counterclockwise direction, as shown in FIG. 6(c). Therefore, the connector 16 may be arranged facing any one of four directions in accordance with the coupling position of the motor 2.

When the actuator 1 is installed in the air conditioning unit, in one of the first to fourth positions, the position that facilitates connection of the harness (not shown) to the connector 16 (or the position that prevents interference of the connector 16 and the harness with other components) is selected. A screw 30 is then inserted through each set of the aligned screw holes 15a, 27c and fastened to the associated threaded hole 21d to fix the yoke 6 to the coupling member 27. The actuator 1 is assembled in this manner.

Figure 5:
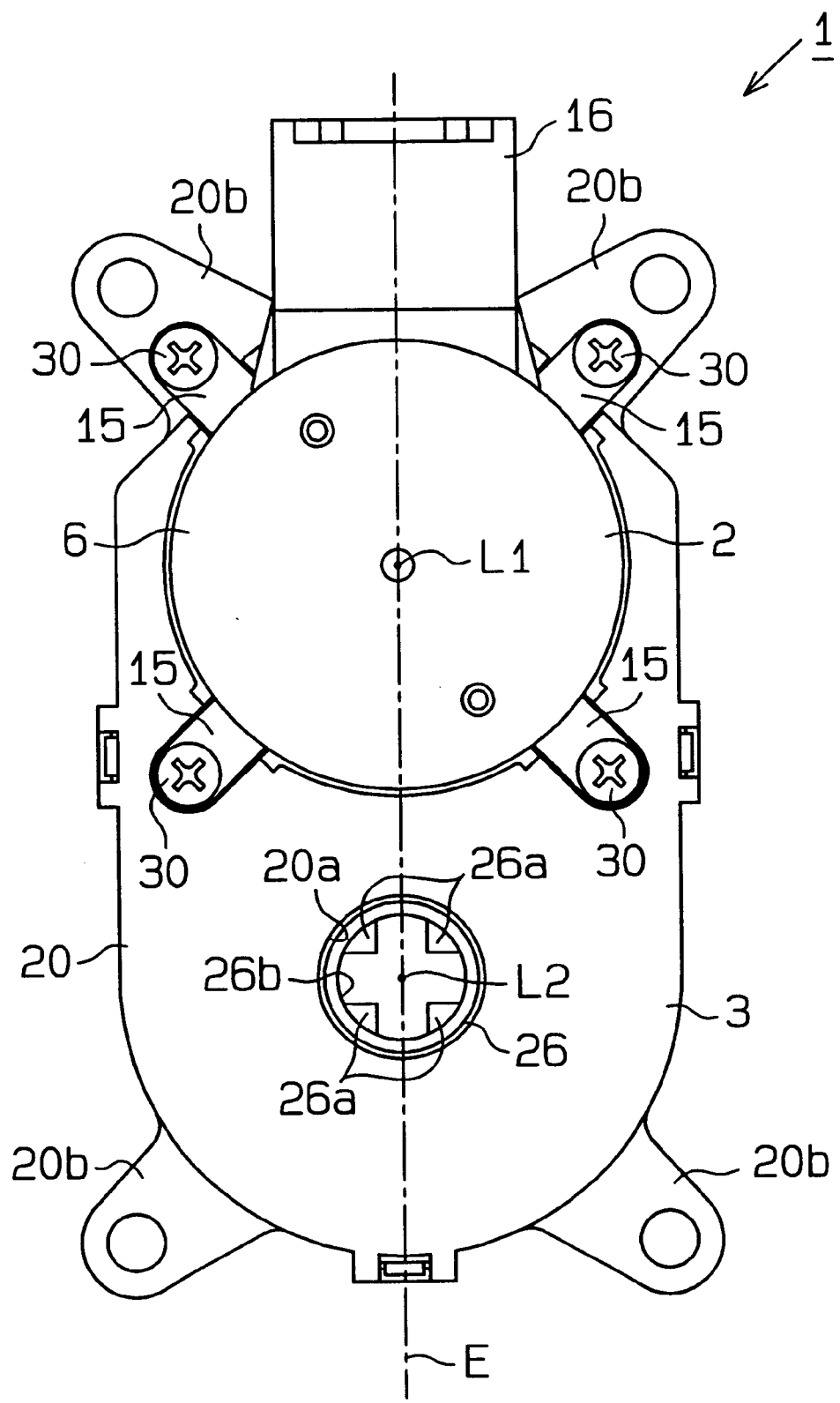
FIG. 5 is a plan view showing the actuator of FIG. 5.

When the yoke 6 is coupled to the coupling member 27, the rotary shaft 13a of the motor 2 is parallel to the output shaft 26. As shown in FIG. 5, the motor 2 and the speed reducer 3 are formed symmetrically about a plane E that includes the axis L1 of the rotary shaft 13a and the axis L2 of the output shaft 26. Accordingly, the tabs 20b, 21c of the respective first and second gear housings 20, 21 are arranged symmetrically about the plane E.

Air conditioning units built for right-hand drive automobiles and air conditioning units built for left-hand drive automobiles have mirror image forms. The actuator 1 may be installed in both types of air conditioning units, since the symmetrically arranged tabs 20b, 21c can be used for both types and interference with other components can be avoided. Accordingly, the actuator 1 may be installed in a wide variety of the air conditioning units without using additional parts such as brackets.

Although a conventional actuator requires an end frame to close its open end, the actuator 1 of the preferred and illustrated embodiment does not use such a frame. The stator core 4 and the yoke 6 are directly coupled to the coupling member 27 to form the motor 2. In addition, the lip 27d, to which the yoke 6 is fitted, is formed integrally with the coupling member 27. In this structure, dust must first pass by the lip 27d and through the slight space between the outer surface of the yoke 6 and the inner surface of the lip 27d to enter the interior of the yoke 6 from between the open end 6a and the coupling member 27. Accordingly, since the lip 27d prevents dust from entering the motor 2, the dust-resistance of the actuator 1 is improved with fewer components.

The support 6b functions as the non-output side bearing of the motor 2. Since the support 6b is integral with the yoke 6, the number of components and the number of assembling steps are less. Further, the bearing is not exposed to the exterior. This prevents dust from entering the yoke 6.

The yoke 6 is fitted in the lip 27d. This prevents loosening of the yoke 6.

The center piece 13 and the magnet 14, which form the magnetic rotor 5 are both made of synthetic resin. This saves material cost and reduces the number of parts thereby decreasing the cost of the actuator 1.

In the preferred and illustrated embodiment, the arrangement of the motor 2 is selected from any one of the four positions, which are shown in FIGS. 5 and 6(a) to 6(d), when coupling the motor 2 to the coupling member 27 of the speed reducer 3. That is, the direction of the connector 16 can be selected when coupling the motor 2. Thus, the actuator 1 permits design flexibility since it may be installed with less restrictions. Since a bracket and an intermediate harness are not necessary to install the actuator 1, the required number of parts is smaller. Since design changes of the air conditioning unit at the place where the actuator 1 is mounted is not necessary, the actuator 1 reduces the number of designing steps. Accordingly, the cost of the entire air conditioning unit is reduced.

The first to fourth positions are arranged at equal angular intervals (90° interval) about the axis L1 of the motor 2. Accordingly, the locations of the positioning projections 27b, the screw holes 27c, and the threaded holes 21d in the speed reducer 3 and the locations of the yoke tabs 15 and the positioning holes in the motor 2 may be determined easily.

An internal gear is used as the input gear 23. This obtains a high reduction ratio without increasing the size of the input gear 23 in the radial direction. Accordingly, the speed reducer 3 and thus the actuator 1 may be smaller.

The output shaft 26 of the actuator 1 has a cross-shaped connecting hole 26b as shown in FIG. 5. This disperses the stress applied to the output shaft 26. Thus, sufficient durability is guaranteed without using expensive, rigid material.

It should be apparent to those skilled in the art that the present invention may be embodied in many other specific forms without departing from the spirit or scope of the invention. Particularly, it should be understood that the present invention may be embodied in the following forms.

In the preferred embodiment, the lip 27d is formed on the coupling member 27 in correspondence with substantially the entire circumference of the yoke 6. However, the lip need only be provided at positions where gaps may be formed in accordance with the shape of the coupling member 27 and the yoke 6.

The pinion end of the rotary shaft 13a is supported by the oil retaining metal bearing 12 in the preferred embodiment. However, other types of bearings may be used. Furthermore, instead of supporting the rotary shaft 13a with a bearing, the rotary shaft 13a may simply be supported by a bore formed in the stator core retainer.

Figure 4A:
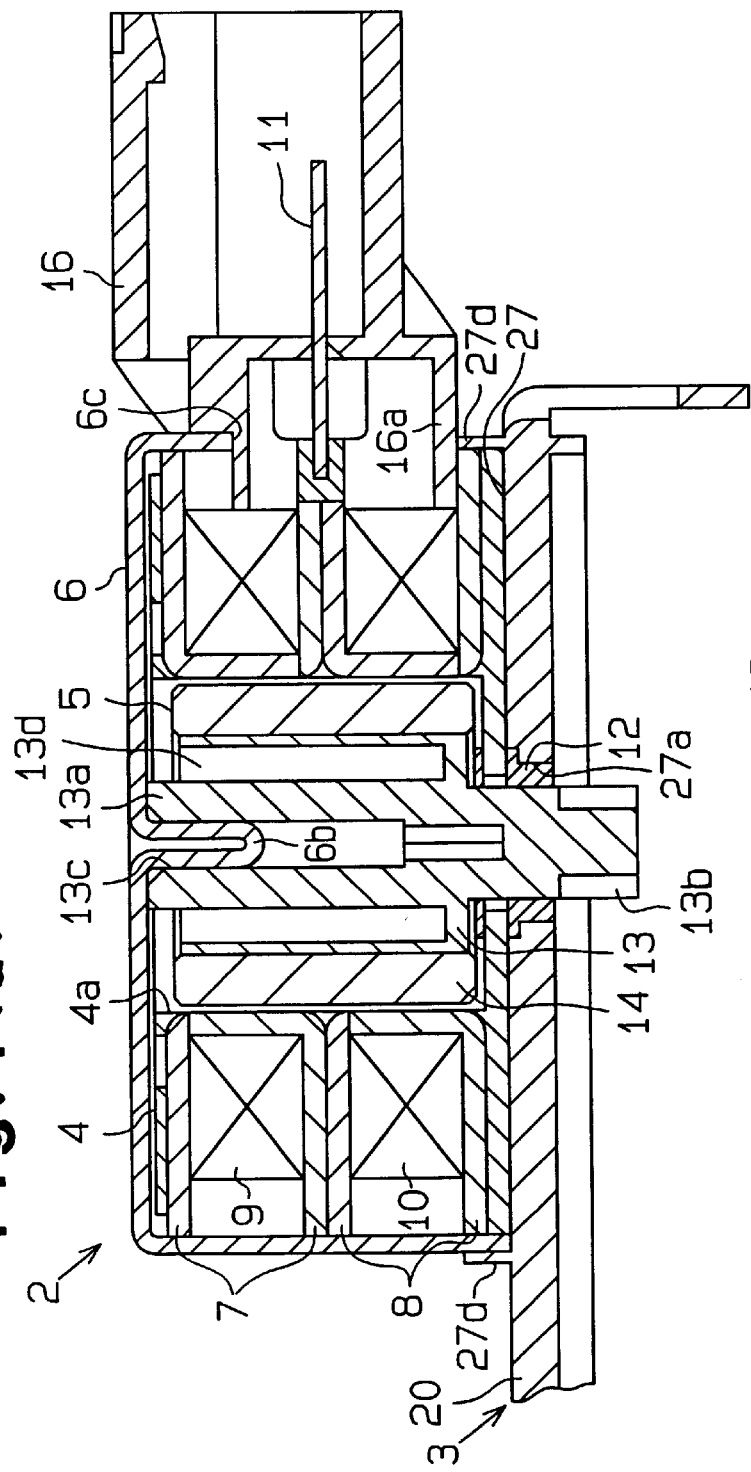
FIG. 4(a) is a partial cross-sectional view showing an actuator according to a further embodiment of the present invention.
Figure 4B:
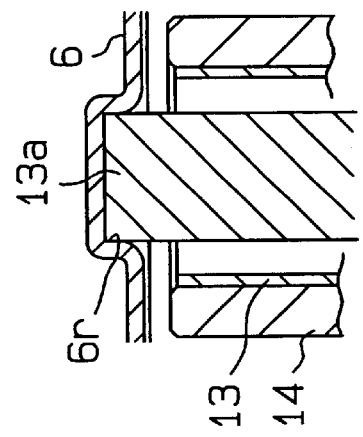
FIG. 4(b) is a partial cross-sectional view showing an actuator according to a further embodiment of the present invention.

As shown in FIG. 4(a), the bearing 12 may be embedded in the shaft hole 27a of the coupling member 27. Further, as shown in FIG. 4(b), a bearing 6r may be formed by projecting part of the yoke 6 outward to support the non-output side of the rotary shaft 13a.

In the preferred embodiment, the center piece 13 and the magnet 14, which form the magnetic rotor 5, are formed integrally from a synthetic resin. However, the center piece 13 and the magnet 14 may be formed from other materials and need not be integral.

The yoke 6 of the motor 2 is coupled directly to the coupling member 27 of the first gear housing 20. However, an end frame may be attached to the open end 6a of the yoke 6, and the yoke 6 may be coupled to the coupling member 27 by the end frame.

In the preferred embodiment, the motor 2 includes the magnetic rotor 5 and the stator core 4, which is provided with the excitation coils 9, 10. However, a motor having a magnetic stator (e.g., DC motor) may be used instead.

The motor 2 is installed in the speed reducer 3 and used as the drive source of the actuator 1. However, the motor 2 may be installed in a device other than the speed reducer 3.

In the preferred embodiment, the coupling position of the motor 2 relative to the speed reducer 3 is selected from various positions, and the outer shape of the actuator 1 is symmetric about a middle plane. However, an actuator satisfying only one of these conditions may also be provided.

The first to fourth motor positions shown in FIGS. 5 and 6(a) to 6(c) differ by equal angles (90°). However, the positions need not be spaced by equal angles if a larger number of such positions is provided.

The outer shapes of the motor 2 and the speed reducer 3 are formed symmetrically about the plane E that includes the axis L1 of the rotary shaft 13a and the axis L2 of the output shaft 26. However, it is only required that at least the outer shape of the speed reducer 3 be symmetrical about a plane that lies along at least the axis L2 of the output shaft 26.

As shown in FIG. 5, a plan view of the actuator 1 shows that the left half is a mirror image of the right half. However, the actuator 1 may be formed so that a side view or a front view shows that the left half is a mirror image of the right half.

In the preferred and illustrated embodiment, an internal gear is used as the input gear 23. However, internal gears may be used for two or more gears of the reduction mechanism. Further, internal gears do not necessarily have to be used.

The present examples and embodiments are to be considered as illustrative and not restrictive, and the invention is not to be limited to the details given herein, but may be modified within the scope and equivalence of the appended claims.

What is claimed is:

1. A motor comprising:
   a hollow yoke having an open end, wherein the yoke is cap-like and has a top portion;
   a coupling member coupled to the yoke to cover the open end of the yoke;
   a stator accommodated in the yoke, wherein the stator has a receptacle;
   a rotor received in the receptacle, wherein the rotor has a first end and a second end;
   a first bearing arranged on the coupling member or the stator to rotatably support the first end of the rotor; and
   a second bearing formed integrally with the yoke to rotatably support the second end of the rotor, wherein the second bearing is a drawn part of the top portion of the yoke that extends along the axis of the rotor and into the interior of the yoke, and wherein the second end of the rotor has a cavity for receiving the second bearing.

2. The motor according to claim 1, wherein the rotor includes a rotary shaft and a magnet surrounding the rotary shaft, both the rotary shaft and the magnet being formed from synthetic resin, wherein the first and second bearings support the rotary shaft.

3. The motor according to claim 1, wherein the coupling member includes a lip for sealing between the coupling member and the open end of the yoke.

4. The motor according to claim 3, wherein the lip is formed to extend along substantially the entire circumference of the yoke.

5. An actuator comprising:
   a motor; and
   a speed reducer accommodating a speed reduction device in a housing, wherein the speed reduction device slows and transmits rotational motion generated by the motor to an output shaft, wherein the motor includes:
   a hollow yoke having an open end, wherein the yoke is cap-like and has a top portion;
   a coupling member coupled to the yoke to cover the open end of the yoke;
   a stator accommodated in the yoke, wherein the stator has a receptacle;
   a rotor received in the receptacle, wherein the rotor has a first end and a second end;
   a first bearing arranged in the coupling member or the stator to rotatably support the first end of the rotor; and
   a second bearing formed integrally with the yoke to rotatably support the second end of the rotor, wherein the second bearing is a drawn part of the top portion of the yoke that extends along the axis of the rotor and into the interior of the yoke, and wherein the second end of the rotor has a cavity for receiving the second bearing.

6. The actuator according to claim 5, wherein the rotor includes a rotary shaft and a magnet surrounding the rotary shaft, both the rotary shaft and the magnet being formed from synthetic resin, wherein the first and second bearings support the rotary shaft.

7. The actuator according to claim 5, wherein the housing includes a lip for sealing between the housing and the open end of the yoke.

8. The actuator according to claim 7, wherein the lip is formed to extend along substantially the entire circumference of the yoke.

9. An actuator comprising:
   a motor, the motor including a rotor rotated about an axis;
   an output shaft;
   a speed reduction device for slowing and transmitting rotational motion generated by the motor to the output shaft, wherein the speed reduction device includes a plurality of gears, and wherein at least one of the plurality of gears is an internal gear;
   a housing for accommodating the speed reduction device; and
   a connector connected to the motor to supply external electric power to the motor;
   wherein a coupling member is arranged on the housing, the coupling member being coupled to the motor, wherein the coupling member is selectively arranged at one of a plurality of coupling positions, the one coupling position being selected by rotating the motor about the rotor axis.

10. The actuator according to claim 9, wherein each coupling position differs from an adjacent coupling position by the same angle of rotation of the coupling member with respect to the motor.

11. The actuator according to claim 9, wherein the housing is formed to have an outer surface that is symmetric about a predetermined plane, which includes the axis of the output shaft.

12. The actuator according to claim 9, wherein the motor and the housing are formed to have outer surfaces that are symmetric about a predetermined plane, which includes the axis of the output shaft.

13. The actuator according to claim 9, wherein the output shaft includes a cross-shaped connecting hole.

14. The actuator according to claim 9, wherein the motor includes a rotary shaft and a pinion formed on the rotary shaft, and wherein the internal gear is an input gear meshed with the pinion.

15. A motor comprising:
   a hollow yoke having an open end, wherein the yoke is cap-like and has a top portion;
   a coupling member coupled to the yoke to cover the open end of the yoke;
   a stator accommodated in the yoke, wherein the stator has a receptacle;
   a rotor received in the receptacle, wherein the rotor has a first end and a second end and includes a rotary shaft and a magnet surrounding the rotary shaft, both the rotary shaft and the magnet being formed integrally from the same synthetic resin with an open space provided between the rotary shaft and the magnet;
   a first bearing arranged on the coupling member or the stator to rotatably support the first end of the rotor; and a second bearing formed integrally with the yoke to rotatably support the second end of the rotor, wherein the second bearing is a drawn part of the top portion of the yoke that extends along the axis of the rotor and into the interior of the yoke, and wherein the second end of the rotor has a cavity for receiving the second bearing.

16. An actuator comprising:

a motor, wherein the motor includes:
    a hollow yoke having an open end, wherein the yoke is cap-like and has a top portion;
    a coupling member arranged on the housing and coupled with the yoke of the motor to cover the open end of the yoke;
    a stator accommodated in the yoke, wherein the stator has a receptacle;
    a rotor received in the receptacle; wherein the rotor has a first end and a second end;
    a first bearing arranged in the coupling member or the stator to rotatably support the first end of the rotor; and
    a second bearing formed integrally with the yoke to rotatably support the second end of the rotor, wherein the second bearing is a drawn part of the top portion of the yoke that extends along the axis of the rotor and into the interior of the yoke, and wherein the second end of the rotor has a cavity for receiving the second bearing; and a speed reducer, wherein the speed reducer includes:
    a housing coupled with the coupling member;
    a speed reduction device accommodated in the housing, wherein the speed reduction device slows and transmits rotational motion generated by the motor to an output shaft; and
    a lip formed on the housing for sealing between the housing and the open end of the yoke, wherein the lip receives and substantially surrounds the yoke when the yoke is coupled with the coupling member.

\* \* \* \* \*